United States Patent
Freed

[15] 3,650,545
[45] Mar. 21, 1972

[54] HOSE SUPPORT AND GUIDE

[72] Inventor: William E. Freed, Box 97, Jonesville, N.C. 28642

[22] Filed: Mar. 9, 1970

[21] Appl. No.: 17,610

[52] U.S. Cl. ............................... 280/421, 248/51, 248/204
[51] Int. Cl. ............................................................. B60d 1/08
[58] Field of Search ................ 280/421, 422, 420; 248/204, 248/51

[56] References Cited

UNITED STATES PATENTS 3,420,546  1/1969  Jasovsky ............................... 280/421
2,027,085  1/1936  Brashears ............................... 248/51
2,984,445  5/1961  Dobrikin ............................... 248/204
2,095,185  10/1937  Fish ............................... 248/51

*Primary Examiner*—Leo Friaglia
*Attorney*—David Rabin

[57] ABSTRACT

A slide bar is positioned upon a first vehicle component for supporting and guiding flexible lines extending between interconnected vehicle components. A flexible, resilient member interconnects the slide bar and a member which grips the flexible lines for permitting displacement of the gripping member and the resilient member laterally of the first vehicle.

4 Claims, 4 Drawing Figures

Patented March 21, 1972

3,650,545

INVENTOR
WILLIAM E. FREED

HOSE SUPPORT AND GUIDE

BACKGROUND, BRIEF SUMMARY AND OBJECTS OF THE INVENTION

This invention relates generally to an arrangement for supporting one or more flexible lines extending between interconnected vehicles, and more particularly to a novel means for supporting and gripping the flexible lines which reduces wear and breakage of the lines.

In conventional tractor-trailer type vehicle arrangements, air hose and/or electrical cables are provided on the truck tractor which are adapted to be releasably coupled with a trailer for operating and controlling various trailer components such as brakes, lights, etc. It has been the normal practice to secure a spring member to the tractor for retaining the hoses and cables in a retracted condition against the rear portion of the tractor cab to prevent damage thereto when the flexible lines are not connected with a trailer. While such arrangements are sufficient for retracting the flexible hoses and cables to an out of the way location on the tractor when not coupled to a trailer, undue stresses and bending forces are imposed upon the flexible lines by such conventional arrangements when secured to a trailer due to the angular displacements of the tractor relative to the trailer.

In accordance with the present invention, the flexible lines are guided and controlled in a manner to prevent damages thereto during turning movements of the tractor relative to the trailer. Briefly, the invention includes an elongated guide bar or rod extending transversely of the tractor for slidably receiving and supporting a resilient flexible member having a clamping arrangement provided at one end thereof. The clamping arrangement frictionally grips and holds the flexible lines intermediate the ends thereof. Upon connection of the flexible lines to a trailer, the resilient member having the clamping arrangement connected thereto is permitted to slide along the guide bar during normal turning movements of the tractor relative to the trailer, preventing undue bending and twisting of the various hoses and cables.

One of the primary objects of the invention is the provision of apparatus for supporting and guiding flexible connector hoses and/or cables in such a manner to prevent damage thereto.

Another object of the invention is the provision of a guiding and supporting apparatus for flexible lines which is of a simple, durable and inexpensive construction.

One feature of the invention is the provision of supporting and guiding apparatus which may be readily and easily adapted for use with conventional vehicles without modification thereto.

Other objects and advantages of the invention will become apparent during the course of the following detailed description.

DETAILED DESCRIPTION OF THE INVENTION

Figure 1:
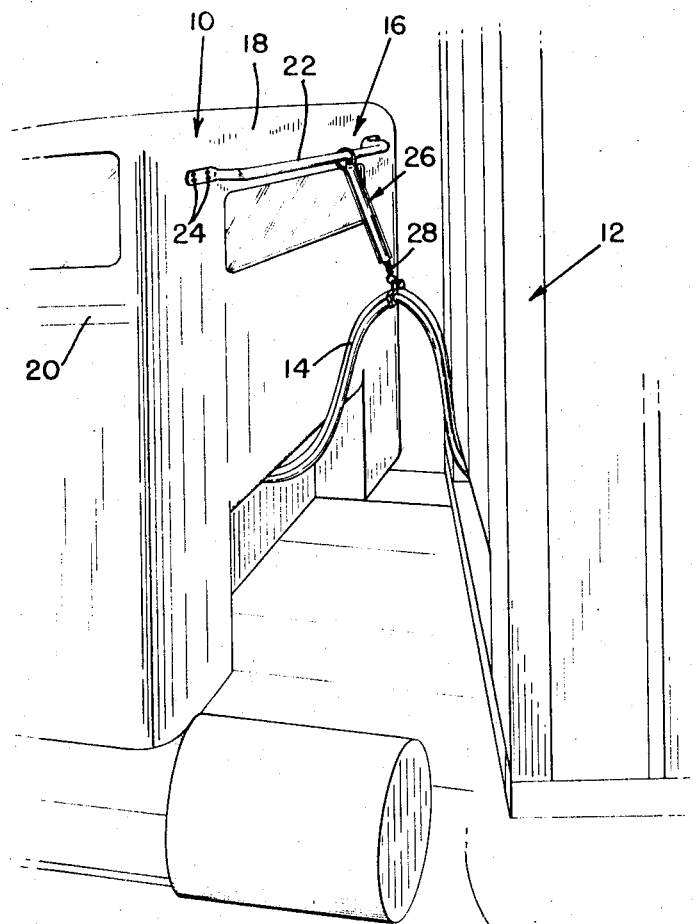
FIG. 1 is a fragmentary, perspective view of a truck tractor coupled to a trailer and illustrating the flexible line guiding and supporting means secured to the tractor cab.

Referring to FIG. 1, reference numeral 10 represents a truck tractor coupled to a trailer 12. A number of flexible hoses 14 secured to the tractor 10 extend between and are releasably secured to suitable conventional connectors, not shown, provided on the trailer 12. The hoses 14 of a length sufficient to permit turning movement of the tractor 10 relative to the trailer 12. A support and guide arrangement 16 is mounted upon the rear portion 18 of the tractor cab 20 near the uppermost extent thereof as shown by FIG. 1.

The support and guide arrangement 16 includes a bar or rod 22 and a connector assembly 26. The rod 22 which is of a generally U-shaped configuration includes an elongated base portion which is spaced parallel to and mounted in a generally horizontal plane at the rear of the truck cab 20. Each end of the U-shaped rod is flattened and positioned against a housing of the truck cab 20 for receiving suitable fasteners 24 which fixedly secure the rod 22 to the cab.

The connector assembly 26 includes an elongated flexible spring member 28 having loop portion 30 at each end. One loop portion has a ring member 32 secured thereto while the other loop portion is attached to a clamping unit 34 which grips and supports the flexible lines 14, shown by FIG. 1. The ring member 32 is sufficiently large to receive the bar 22 therethrough such that the suspended ring member 32 and connector assembly 26 can be slidably displaced on the bar 22 upon turning movement of the tractor 10.

Figure 2:
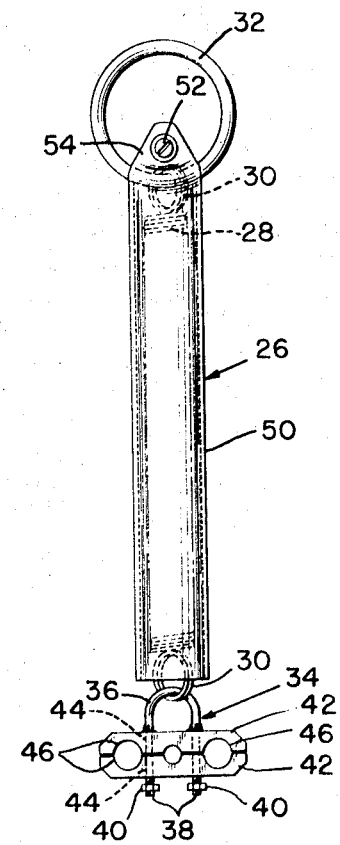
FIG. 2 is an enlarged elevational view of the clamping means for holding the flexible lines and the resilient means for connecting the clamping means to the slide bar.

The clamping unit 34 includes a U-bolt 36 having threaded leg portions 38 for receiving nuts 40 thereon. A pair of gripping members 42, 42, constructed of hard rubber or other suitable material, and each having a plurality of semicircular openings or recesses 46 therein, are slidably received upon leg portions 38. The leg portions 38 pass through spaced openings 44 in the gripping members 42. The gripping members 42 are mounted, as shown in FIG. 2, such that the recesses 46 are in confronting relation defining openings for receiving the flexible lines 14 therein. Stop members 48 are provided on the leg portions 38 to limit the displacement of the gripping members 42 upon tightening of nuts 40.

The spring 28 is enclosed within a generally tubular leatherlike covering member 50 which serves to protect the spring and to reduce noise by preventing metal to metal contact between the cab 20 and the spring when the flexible lines are disconnected from the trailer 12. The covering member 50 is supported upon the spring 28 by a fastener 52 which passes through tapered cover end portions 54 within the confines of the ring member 32. Alternatively, the spring 28 could be slidably enclosed within a sleeve member of polyethylene or other equivalent materials, rather than the leatherlike covering member.

Figure 3:
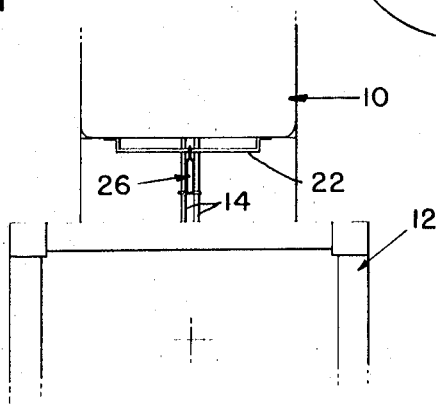
FIG. 3 is a fragmentary, schematic, top plan view of the present invention for supporting flexible lines extending between a truck tractor and a trailer.
Figure 4:
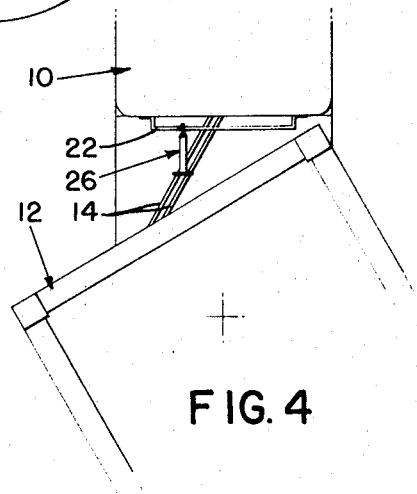
FIG. 4 is a view similar to FIG. 3 with the trailer and tractor being angularly disposed illustrating the displaced position of the clamping means and the resilient means.

In operation of the supporting guide means, the nuts 40 and lowermost gripping member 42 are removed for receiving the air hose and/or electrical cables 14. Lower gripping member 42 is replaced upon leg portions 38 and nuts 40 are tightened to grip the flexible hoses or cables. Normally the flexible lines 14 are gripped by unit 34 approximately midway between the ends thereof as shown by FIG. 1. When the lines 14 are disconnected from the trailer, spring 28 retracts the lines to an out of the way position to prevent damage thereto. Upon connection of the lines 14 with the trailer, the connector assembly 26 would be positioned upon bar 22 generally as shown by FIG. 3, as long as the trailer 12 is aligned with and directly behind the tractor cab 20. However, upon turning movement or angular displacement of the cab relative to the trailer, the connector assembly 26 is permitted to slide upon bar 22 as shown by FIG. 4 to reduce stresses and undue bending and twisting of the flexible lines 14. Since the connector assembly 26 is permitted to slide laterally of the cab, the support point of the spring 26 is displaced resulting in relatively little stretch or tension applied to the spring consequently resulting in a minimum amount of stress being applied to the flexible lines.

I claim:

1. Apparatus for supporting and positioning flexible lines extending between interconnected vehicle components comprising: means for holding the flexible lines intermediate the vehicle components, and support means attached to one of the vehicle components and to said holding means for permitting displacement of said holding means laterally of the vehicle component supporting said attaching means upon angular displacement of the vehicle components relative to each other, said support means including a generally U-shaped bar secured upon one of the vehicle components in the horizontally disposed plane, said holding means including a support ring encompassing and suspended from said rod, a releasable flexible line clamp and a resilient, flexible means interposed between said ring and said line clamp.

2. Apparatus for supporting and positioning flexible lines as defined in claim 1, wherein said resilient, flexible member is enclosed within a protective covering.

3. Apparatus for supporting and positioning flexible lines as defined in claim 1, and further including a cover member for receiving said resilient, flexible means therein, and means for maintaining said cover member upon said spring means.

4. Apparatus for supporting and positioning flexible lines as defined in claim 1, said releasable line clamp comprising a U-shaped member, a pair of gripping elements slidably receivable upon said U-shaped member, said gripping elements defining a plurality of openings for receiving said flexible lines therein.

* * * * *